(12) United States Patent
Hofmann et al.

(10) Patent No.: US 9,352,999 B2
(45) Date of Patent: *May 31, 2016

(54) GLASS COMPOSITION FOR PRODUCING HIGH STRENGTH AND HIGH MODULUS FIBERS

(75) Inventors: Douglas A. Hofmann, Hebron, OH (US); Peter Bernard McGinnis, Gahanna, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,508

(22) PCT Filed: Jun. 30, 2011

(86) PCT No.: PCT/IB2011/052897
§ 371 (c)(1),
(2), (4) Date: Jan. 16, 2013

(87) PCT Pub. No.: WO2012/001654
PCT Pub. Date: Jan. 5, 2012

(65) Prior Publication Data
US 2013/0122767 A1 May 16, 2013

Related U.S. Application Data

(60) Provisional application No. 61/360,188, filed on Jun. 30, 2010.

(51) Int. Cl.
*C03C 13/00* (2006.01)
*C03C 3/085* (2006.01)
*C03C 3/087* (2006.01)
*B29K 309/08* (2006.01)
*B29L 31/08* (2006.01)

(52) U.S. Cl.
CPC .......... *C03C 13/00* (2013.01); *C03C 3/085* (2013.01); *C03C 3/087* (2013.01); *B29K 2309/08* (2013.01); *B29L 2031/085* (2013.01); *Y02P 70/523* (2015.11); *Y10T 442/2934* (2015.04); *Y10T 442/2951* (2015.04); *Y10T 442/2992* (2015.04)

(58) Field of Classification Search
CPC ........ C03C 13/00; C03C 13/06; C03C 13/045
USPC ............ 501/35–36, 38, 68–70, 6, 7, 27
See application file for complete search history.

(56) References Cited

U.S. PATENT DOCUMENTS

| | | | |
|---|---|---|---|
| 3,189,471 A | 6/1965 | Thomas | |
| 5,084,328 A | 1/1992 | Fine et al. | |
| 6,998,361 B2 * | 2/2006 | Lewis | 501/36 |
| 7,189,671 B1 | 3/2007 | Lewis | |
| 7,700,682 B2 | 4/2010 | Sekine | |
| 2004/0092379 A1 | 5/2004 | Lewis | |
| 2004/0157720 A1 * | 8/2004 | Sakamoto | C03C 10/0027 501/4 |
| 2007/0112123 A1 | 5/2007 | Sekine | |
| 2007/0129231 A1 * | 6/2007 | Comte | C03C 10/0027 501/4 |
| 2010/0076155 A1 | 3/2010 | Higashiyama et al. | |
| 2010/0160139 A1 | 6/2010 | McGinnis | |
| 2010/0162772 A1 * | 7/2010 | McGinnis et al. | 65/474 |
| 2010/0224619 A1 * | 9/2010 | Schoenberger | C03C 1/004 219/443.1 |
| 2012/0060678 A1 * | 3/2012 | Peters et al. | 89/36.02 |
| 2013/0210962 A1 | 8/2013 | Hofmann et al. | |
| 2013/0338268 A1 | 12/2013 | Hofmann et al. | |

FOREIGN PATENT DOCUMENTS

| | | |
|---|---|---|
| CN | 1243501 | 2/2000 |
| CN | 1589243 | 3/2005 |
| CN | 101636360 | 1/2010 |
| GB | 1055014 | 1/1967 |
| WO | 2012/001654 | 1/2012 |
| WO | 2012/001655 | 1/2012 |
| WO | 2012/001656 | 1/2012 |

OTHER PUBLICATIONS

Bacon, J.F., "Investigation of the Kinetics of Crystallization of Molten Binary and Ternary Oxide Systems", Nov. 1, 1969, United Aircraft Research Laboratories, Summary and Quarterly Status Report No. 16, front cover and table of contents, 8 pgs.
Bacon, J.F., "Determining and Analyzing the Strength and Impact Resistance of High Modulus Glass", Nov. 15, 1971, United Aircraft Research Laboratories, Quarterly Status Report No. 3, front cover and table of contents, 4 pgs.
Bacon, J.F., The Kinetics of Crystallization of Molten Binary and Ternary Oxide Systems and Their Application to the Origination of High Modulus Glass Fibers, United Aircraft Research Laboratories, Nov. 15, 1971, Nasa Contractor Report, 20 pgs.
Loewenstein, K.L., "Studies in the composition and structure of glasses possessing high Youn's moduli", Physics and Chemistry of Glasses, vol. 2, No. 3, Jun. 3, 1961, pp. 69-82.
Murgatroyd, J.B., The Strength of Glass Fibres. Part 1. Elastic Properties, J. of the Society of Glass Technology, vol. 28, pp. 368-373 and 382-387, 7 pgs.

(Continued)

*Primary Examiner* — Jennifer Chriss
*Assistant Examiner* — Camie Thompson
(74) *Attorney, Agent, or Firm* — Calfee, Halter & Griswold LLP

(57) ABSTRACT

A glass composition including $SiO_2$ in an amount from about 69.5 to about 80.0% by weight, $Al_2O_3$ in an amount from about 5.0 to about 18.5% by weight, MgO in an amount from about 5.0 to about 14.75% by weight, CaO in an amount from 0.0 to about 3.0% by weight, $Li_2O$ in an amount from about 3.25 to about 4.0% by weight, and Na2O in an amount from 0.0 to about 2.0% by weight is provided. Glass fibers formed from the inventive composition may be used in applications that require high strength, high stiffness, and low weight. Such applications include, but are not limited to, woven fabrics for use in forming wind blades, armor plating, and aerospace structures.

26 Claims, No Drawings

(56) References Cited

OTHER PUBLICATIONS

International Search Report and Written Opinion from PCT/IB11/052898 dated Apr. 2, 2012.
International Search Report and Written Opinion from PCT/IB11/052897 dated Apr. 2, 2012.
International Search Report and Written Opinion from PCT/IB11/052899 dated Apr. 2, 2012.
Heidenreich et al., "Studium des Einflusses von Li2O und Na2O auf die Kristallisation von fluordotierten MgO—Al2O3—SiO2-G1A, sern", Silikattechink, vol. 28, No. 2, Jan. 1, 1977, pp. 45-48. (cited in International Search Report from PCT/IB11/052889).
Fisher, J.R., "Glass Fiber Drawing and Measuring Facilities at the U.S. Naval Ordnance Laboratory", Aug. 1965.
Office action from Chinese Application No. 201180037082.1 dated Sep. 3, 2014.
Office action from Chinese Application No. 201180037104.4 dated Sep. 1, 2014.
Office action from European Application No. 11743151.0 dated Aug. 5, 2015.
Office action from Chinese Application No. 201180037082.1 dated Aug. 19, 2015.
Office action from U.S. Appl. No. 13/719,520 dated Jun. 15, 2015.
Office action from Chinese Application No. 201180037104.4 dated Jun. 30, 2015.
Office action from U.S. Appl. No. 13/719,520 dated Sep. 17, 2015.
Office action from Chinese Application No. 201180037082.1 dated Nov. 17, 2015.
Office action from Chinese Application No. 201180037080.2 dated Oct. 16, 2015.
Office action from Chinese Application No. 201180037080.2 dated Sep. 26, 2014.
"Glass Technology" Zhao Yanzhao et al. pp. 188-195—Sep. 30, 2006.
Office action from Chinese Application No. 201180037082.1 dated Apr. 20, 2015.
Notice of Allowance from U.S. Appl. No. 13/719,490 dated Jan. 12, 2015.
Office action from Chinese Application No. 201180037080.2 dated Apr. 23, 2015.
Notice of Allowance from U.S. Appl. No. 13/719,520 dated Feb. 18, 2016.
Chinese Application No. 201180037104.4 dated Dec. 18, 2015.

* cited by examiner

US 9,352,999 B2

GLASS COMPOSITION FOR PRODUCING HIGH STRENGTH AND HIGH MODULUS FIBERS

CROSS REFERENCE TO RELATED APPLICATION

This application is the U.S. national phase entry of PCT/IB11/052897 with an international filing date of Jun. 30, 2011 which claims priority and all other benefits of U.S. Provisional Application Ser. No. 61/360,188 both of which are hereby incorporated by reference in their entirety.

TECHNICAL FIELD AND INDUSTRIAL APPLICABILITY

The present invention relates generally to a glass composition, and more particularly, to a high performance glass composition that possesses acceptable forming properties and whose components are melted in a refractory melter. Glass fibers formed from the inventive composition possess high strength and improved modulus and may be used to reinforce composite matrices where high strength, stiffness and light weight are desired.

BACKGROUND

Glass fibers are manufactured from various raw materials combined in specific proportions to yield a desired chemical composition. This collection of materials is commonly termed a "glass batch." To form glass fibers, typically the glass batch is melted in a melter or melting apparatus, the molten glass is drawn into filaments through a bushing or orifice plate, and a sizing composition containing lubricants, coupling agents, and film-forming binder resins is applied to the filaments. After the sizing is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers.

The composition of the glass batch and the glass manufactured from it are typically expressed in terms of percentages of the components, which are mainly expressed as oxides. $SiO_2$, $Al_2O_3$, CaO, MgO, $B_2O_3$, $Na_2O$, $K_2O$, $Fe_2O_3$, and minor amounts of other compounds such as $TiO_2$, $Li_2O$, BaO, SrO, ZnO, $ZrO_2$, $P_2O_5$, fluorine, and $SO_3$ are common components of a glass batch. Numerous types of glasses may be produced from varying the amounts of these oxides, or eliminating some of the oxides in the glass batch. Examples of such glasses that may be produced include R-glass, E-glass, S-glass, A-glass, C-glass, and ECR-glass. The glass composition controls the forming and product properties of the glass. Other characteristics of glass compositions include the raw material cost and environmental impact.

There is a unique combination of forming properties that permit a glass to be melted and distributed in a conventional refractory tank and glass distribution system. First, the temperature at which the glass is held must be low enough so that the refractory is not compromised. The refractory can be compromised, for example, by exceeding the maximum use temperature of the refractory or by increasing the rate at which the glass corrodes and erodes the refractory to an unacceptably high level. Refractory corrosion rate is strongly increased as the glass becomes more fluid by a decrease in the glass viscosity. Therefore, in order for a glass to be melted in a refractory tank, the temperature of the refractory must be kept below a certain temperature and the glass viscosity (i.e., resistance to flow) must be maintained above a certain value. Also, the temperature of the glass in the melting unit, as well as throughout the entire distribution and fiberizing process, must be high enough to prevent crystallization of the glass (i.e., it must be kept at a temperature above the liquidus temperature).

At the fiberizer, it is common to require a minimum temperature differential between the temperature selected for fiberizing (i.e., forming temperature) and the liquidus temperature of the glass. This temperature differential, ΔT, is a measurement of how easily continuous fibers can be formed without production of the fibers being interrupted by breaks caused from devitrification crystals. Accordingly, it is desirable to have as large a ΔT as possible to achieve continuous and uninterrupted glass fiber formation.

In the quest for glass fibers having a higher end performance, ΔT has, at times, been sacrificed to achieve desired end properties. The consequence of this sacrifice is a requirement that the glass be melted in a platinum or platinum-alloy lined furnace, either because the temperature exceeded the maximum end use temperature of the conventional refractory materials or because the viscosity of the glass was such that the temperature of the glass body could not be held above the liquidus temperature while producing a glass viscosity high enough to keep the refractory corrosion at an acceptable level. S2-glass is one example where both of these phenomena take place. The melting temperature of S2-glass is too high for common refractory materials and the ΔT is very small (or negative), thus causing the glass to be very fluid and very corrosive to conventional refractories at glass temperatures above the liquidus temperature. Conventional R-glass also has a very small ΔT, and is therefore melted in platinum or platinum-alloy lined melters.

Thus, there is a need in the art for high-performance glass compositions that retain favorable mechanical and physical properties (e.g., specific modulus and specific tensile strength) and forming properties (e.g., liquidus temperature and forming temperature) where the forming temperature is sufficiently low and the difference between the forming and liquidus temperatures is large enough to enable the components of the glass composition to be melted in a conventional refractory tank.

SUMMARY

In one embodiment of the invention, a composition that includes $SiO_2$ in an amount from about 69.5 to about 80.0% by weight, $Al_2O_3$ in an amount from about 5.0 to about 18.5% by weight, CaO in an amount from 0.0 to about 3.0% by weight, MgO in an amount from about 5.0 to about 14.75% by weight, $Li_2O$ in an amount from about 3.25 to about 4.0% by weight, and $Na_2O$ in an amount from 0.0 to about 2.0% by weight is provided. The phrase "% by weight", as used herein, is intended to be defined as the percent by weight of the total composition. In exemplary embodiments, the glass composition is free or substantially free of $B_2O_3$ and fluorine, although either can be added in small amounts to adjust the fiberizing and finished glass properties and will not adversely impact the properties if maintained below several percent. As used herein, substantially free of $B_2O_3$ and fluorine means that the sum of the amounts of $B_2O_3$ and fluorine present in the composition is less than 1% by weight of the composition. The sum of the amounts of $B_2O_3$ and fluorine present in the composition can be less than 0.5% by weight of the composition, or less than 0.2% by weight of the composition. Additionally, the composition may optionally contain trace quantities of other components or impurities that are not intentionally added. Further, the glass composition possesses a forming temperature (also referred to herein as the forming viscosity or the fiberizing temperature or the log 3 temperature) that is low enough to utilize low cost refractory melters instead of conventional high cost platinum-alloy lined melters in the formation of the glass fibers.

In another embodiment of the present invention, a continuous glass fiber formed of the composition described above is produced using a refractory tank melter. By utilizing a refractory tank formed of refractory blocks, manufacturing costs associated with the production of glass fibers produced by the inventive composition may be reduced. The glass compositions may be used to form continuous glass strands for use in applications where high strength, stiffness, and low density are required.

In yet another embodiment of the present invention, a reinforced composite formed of a matrix material and a plurality of fibers formed with the composition described above is provided. The matrix material may be any suitable thermoplastic or thermoset resin known to those of skill in the art, and include thermoplastics such as polyesters, polypropylene, polyamide, polyethylene terephtalate, and polybutylene, and thermoset resins such as epoxy resins, unsaturated polyesters, phenolics, vinylesters, and elastomers. The polymer resins can be used alone or in combination to form the final composite product.

In a further embodiment of the present invention, a method of forming a high performance glass fiber is provided. The fibers may be formed by obtaining the raw ingredients and mixing the components in the appropriate quantities to give the desired weight percentages of the final composition. The mixed batch is then melted in a traditional refractory melter and drawn through orifices of platinum-alloy based bushings to form glass fibers. Strands of glass fibers are formed by gathering the individual filaments together. The strands may be wound and further processed in a conventional manner suitable for the intended application. The glass fibers of the present invention are obtainable by any of the methods of forming glass fibers described herein.

In another embodiment of the present invention, glass fibers formed from the inventive compositions have a liquidus temperature no greater than about 1510 or about 1500° C., a log 3 temperature less than about 1550° C. and a ΔT up to about 250° C.

In one embodiment of the present invention, glass fibers formed from the inventive compositions have a liquidus temperature no greater than about 1440° C., a log 3 temperature less than about 1410° C. and a ΔT up to about 50° C.

In another embodiment, the glass fibers formed from the inventive composition have a pristine fiber tensile strength between about 4200 and about 5000 MPa, a modulus between about 78 and about 86 or 86.5 GPa and a density from about 2.35 to about 2.46 g/cc.

In a further embodiment of the invention, glass fibers formed from the inventive composition have a specific modulus between about 33.9 MJ/kg and about 35.0 MJ/kg and a specific strength between about 1.74 MJ/kg and about 2.09 MJ/kg.

In another embodiment of the present invention, the glass composition possesses a forming viscosity that is low enough, and a ΔT that is large enough, to utilize low cost refractory melters instead of conventional high cost platinum-alloy lined melters in the formation of the glass fibers.

In another embodiment of the present invention, fibers formed from the inventive composition are formed at a lower cost due to the lower energy input needed to melt the glass composition.

The foregoing and other objects, features, and advantages of the invention will appear more fully hereinafter from a consideration of the detailed description that follows.

DETAILED DESCRIPTION AND PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references. The terms "composition" and "formulation" may be used interchangeably herein. Additionally, the phrase "inventive glass composition" and "glass composition" may be interchangeably used.

The present invention relates to a glass composition used to form continuous glass fibers that possess an improved strength, modulus and low density. In particular, the present invention relates to a glass composition suitable for preparing glass fibers that have an excellent modulus value and low density. In some embodiments, the glass composition possesses a low forming temperature and a sufficiently large ΔT to permit the utilization of low-cost refractory tank melters for the formation of the glass fibers instead of conventional high-cost paramelters formed of platinum. Surprisingly, it has been found that this can be achieved without comprising the strength of the glass, in a glass composition comprising a relatively high amount of $SiO_2$, by adding a relatively high amount of $Li_2O$. By utilizing a refractory tank formed of refractory blocks, manufacturing costs associated with the production of glass fibers produced by the inventive composition are reduced. Additionally, the energy necessary to melt the components of the glass composition is less than the energy necessary to melt many commercially available glass formulations. Such lower energy requirements may also lower the overall manufacturing costs associated with the inventive glass. Further, the composition of the present invention retains the ability to make a commercially acceptable high performance glass fiber and fiber product produced from the glass fibers. In particular, glass fibers formed using the inventive composition may be used to form composite products that are both light weight and exceptionally strong.

The inventive glass composition includes the following components in the weight percent ranges given in Table 1. As used herein, the teams "weight percent" and "percent by weight" may be used interchangeably and are meant to denote the weight percent (or percent by weight) based on the total composition.

TABLE 1

| Chemical | % by weight |
| --- | --- |
| $SiO_2$ | 69.5-80.0 |
| $Al_2O_3$ | 5.0-18.5 |
| MgO | 5.0-14.75 |

TABLE 1-continued

| Chemical | % by weight |
|---|---|
| CaO | 0.0-3.0 |
| $Li_2O$ | 3.25-4.0 |
| $Na_2O$ | 0.0-2.0 |

In one embodiment, the glass composition comprises $Al_2O_3$ in an amount of from 9.5 to 15.4% by weight and MgO in an amount of from 5.0 to 10.2% by weight and thus includes the components set forth in Table 2.

TABLE 2

| Chemical | % by weight |
|---|---|
| $SiO_2$ | 69.5-80.0 |
| $Al_2O_3$ | 9.5-15.4 |
| MgO | 5.0-10.2 |
| CaO | 0.0-3.0 |
| $Li_2O$ | 3.25-4.00 |
| $Na_2O$ | 0.0-2.0 |

In another embodiment, the glass composition comprises MgO in an amount of from 6.9 to 10.2% by weight and thus includes the components set forth in Table 3.

TABLE 3

| Chemical | % by weight |
|---|---|
| $SiO_2$ | 69.50-80.0 |
| $Al_2O_3$ | 9.50-15.40 |
| MgO | 6.90-10.20 |
| CaO | 0.0-3.0 |
| $Li_2O$ | 3.25-4.00 |
| $Na_2O$ | 0.0-2.0 |

In another embodiment, the glass composition comprises $SiO_2$ in an amount of from 69.5 to 74.5% by weight and $Al_2O_3$ in an amount of from 10.20 to 18.5% by weight and thus includes the components set forth in Table 4.

TABLE 4

| Chemical | % by weight |
|---|---|
| $SiO_2$ | 69.50-74.50 |
| $Al_2O_3$ | 10.20-18.50 |
| MgO | 5.00-14.75 |
| CaO | 0.0-3.0 |
| $Li_2O$ | 3.25-4.00 |
| $Na_2O$ | 0.0-2.0 |

In another embodiment, the glass composition comprises $SiO_2$ in an amount of from 69.5 to 76.5% by weight and $Al_2O_3$ in an amount of from 5.0 to 15.4% by weight and thus includes the components set forth in Table 5.

TABLE 5

| Chemical | % by weight |
|---|---|
| $SiO_2$ | 69.50-76.50 |
| $Al_2O_3$ | 5.00-15.40 |
| MgO | 5.00-14.75 |
| CaO | 0.0-3.0 |
| $Li_2O$ | 3.25-4.00 |
| $Na_2O$ | 0.0-2.0 |

In each of the embodiments represented by Tables 1 to 5, CaO can be present in an amount of from 0.18 or from 0.2 to 3.0% by weight and $Na_2O$ can be present in an amount of from 0.04 to 2.0% by weight.

Further, impurities or tramp materials may be present in the glass composition without adversely affecting the glasses or the fibers. These impurities may enter the glass as raw material impurities or may be products formed by the chemical reaction of the molten glass with furnace components. Non-limiting examples of tramp materials include chromium, zirconium, potassium, iron, zinc, strontium, and barium, all of which are present in their oxide forms, and fluorine and chlorine. The glass composition of the present invention can be free or substantially free of $B_2O_3$ and fluorine.

The present invention also relates to glass fibers formed from the inventive glass compositions described above. Pristine glass fibers (i.e., unsized and untouched laboratory produced fibers) have a fiber tensile strength between about 4200 and about 5000 MPa. Additionally, the pristine fibers have a modulus between about 78 and about 86 GPa and a density from about 2.35 to about 2.46 g/cc (compare S2 glass at 2.48 g/cc). The fiber tensile strength is also referred to herein as "strength" and is measured on pristine fibers using an Instron tensile testing apparatus according to ASTM D2343-09. As referred to herein, the modulus is an average of measurements on 5 single glass fibers measured in accordance with the procedure outlined in the report, "Glass Fiber and Measuring Facilities at the U.S. Naval Ordnance Laboratory", Report Number NOLTR 65-87, Jun. 23, 1965. The density is measured by the Archimedes method (ASTM C693-93 (2008)) on unannealed bulk glass.

Fiberizing properties of the glass composition of the present invention include the fiberizing temperature, the liquidus temperature, and ΔT. The fiberizing temperature is defined as the temperature that corresponds to a viscosity of about 1000 Poise and as used herein is measured using a rotating cylinder method (ASTM C965-96 (2007)). The fiberizing temperature can also be referred to as the log 3 temperature or the forming viscosity. Lowering the fiberizing temperature may reduce the production cost of the glass fibers because it allows for a longer bushing life and reduced energy usage. For example, at a lower fiberizing temperature, a bushing operates at a cooler temperature and does not quickly "sag". Sag is a phenomenon that occurs in bushings that are held at an elevated temperature for extended periods of time. Thus, by lowering the fiberizing temperature, the sag rate of the bushing may be reduced and the bushing life can be increased.

In addition, a lower fiberizing temperature allows for a higher throughput since more glass can be melted in a given period at a given energy input. Additionally, a lower fiberizing temperature will permit glass formed with the inventive composition to be melted in a refractory-lined melter instead of conventional high-cost paramelters formed of platinum since both its melting and fiberizing temperatures are below the upper use temperatures of many commercially available refractories. In the present invention, the glass composition has a fiberizing temperature (i.e., log 3 temperature) that is less than about 1550° C. The fiberizing temperature can be from about 1255 or from about 1300° C. to about 1550° C. In one embodiment, the glass composition of the present invention can have a fiberizing temperature of less than about 1410° C. In exemplary embodiments, the fiberizing temperature is from 1255 to 1410° C.

The liquidus temperature is defined as the highest temperature at which equilibrium exists between liquid glass and its primary crystalline phase. As used herein the liquidus temperature is measured by exposing the glass composition to a temperature gradient in a platinum-alloy boat for 16 hours (ASTM C829-81 (2005)). At all temperatures above the liquidus temperature, the glass is free from crystals in its primary phase. At temperatures below the liquidus temperature, crystals may form. Additionally, the liquidus temperature is the greatest temperature at which devitrification can occur upon cooling the glass melt. At all temperatures above the liquidus temperature, the glass is completely molten. The liquidus temperature of the inventive composition is desirably no greater than about 1505 or about 1500° C., and may range from about 1225 or 1240° C. to about 1500° C. In one embodiment, the liquidus temperature is no greater than 1440° C. and may range from about 1225° C. to about 1440° C.

A third fiberizing property is "$\Delta T$", which is defined as the difference between the fiberizing temperature (i.e., log 3 temperature) and the liquidus temperature. If the $\Delta T$ is too small, the molten glass may crystallize within the fiberizing apparatus and cause a break in the manufacturing process. Desirably, the $\Delta T$ is as large as possible for a given forming viscosity. A larger $\Delta T$ offers a greater degree of flexibility during fiberizing and helps to avoid devitrification both in the glass distribution system and in the fiberizing apparatus. Additionally, a large $\Delta T$ reduces the production cost of the glass fibers by allowing for a greater bushing life and a less sensitive forming process. The inventive composition may have a $\Delta T$ up to about 250° C., and in exemplary embodiments, from about −70° C. to about 250° C.

In one embodiment the inventive composition may have a $\Delta T$ from about 100° C. to about 250° C. In this embodiment, the inventive composition can correspond to that defined in Table 3 above.

Another property of importance is the specific modulus. It is desirable to have a specific modulus as high as possible to achieve a lightweight composite material that adds stiffness to the final article. Specific modulus is important in applications where stiffness of the product is an important parameter, such as in wind energy and aerospace applications. In exemplary embodiments, the glass fibers have a specific modulus from about 33.9 MJ/kg to about 35.0 MJ/kg (compare S2 glass at 36.0 MJ/kg). In addition, the glass fibers have a specific strength from about 1.74 MJ/kg to about 2.09 MJ/kg (compare S2 glass at 2.01 MJ/kg).

In one embodiment, the glass fibers of the invention have a specific modulus of greater than 34.1 MJ/Kg, thus having a specific modulus that exceeds that of commercial R-glass. In this embodiment the glass fibers have a specific modulus of greater than about 34.1 M J/kg to about 35.0 M J/kg. In this embodiment, the glass fibers of the invention can be formed from the composition defined in Table 4 above.

In another embodiment, the glass fibers of the invention have a specific strength of greater than 2.01 MJ/Kg, thus having a specific strength that exceeds that of S2 glass. In this embodiment the glass fibers have a specific strength of greater than about 2.01 MJ/kg to about 2.09 MJ/kg. In this embodiment, the glass fibers of the invention can be formed from the composition defined in Table 5 above.

In general, glass fibers according to the present invention may be formed by obtaining the raw materials or ingredients and mixing or blending the components in a conventional manner in the appropriate quantities to give the desired weight percentages of the final composition. For example, the components may be obtained from suitable ingredients or raw materials including, but not limited to, sand or pyrophyllite for $SiO_2$, limestone, burnt lime, wollastonite, or dolomite for CaO, kaolin, alumina or pyrophyllite for $Al_2O_3$, dolomite, dolomitic quicklime, brucite, enstatite, talc, burnt magnesite, or magnesite for MgO, lithium carbonate or spodumene for $Li_2O$ and sodium carbonate, sodium feldspar or sodium sulfate for the $Na_2O$. Glass cullet can also be used to supply one or more of the needed oxides. The mixed batch is then melted in a traditional refractory furnace or melter, and the resulting molten glass is passed along a forehearth and into bushings (e.g., platinum-alloy based bushings) located along the bottom of the forehearth. The operating temperatures of the glass in the furnace, forehearth, and bushing are selected to appropriately adjust the viscosity of the glass, and may be maintained using suitable methods such as control devices. Preferably, the temperature at the front end of the melter is automatically controlled to reduce or eliminate devitrification. The molten glass is then pulled (drawn) through holes or orifices in the bottom or tip plate of the bushing to form glass fibers. The streams of molten glass flowing through the bushing orifices are attenuated to filaments by winding a strand formed of a plurality of individual filaments on a forming tube mounted on a rotatable collet of a winding machine or chopped at an adaptive speed.

The fibers may be further processed in a conventional manner suitable for the intended application. For instance, the glass fibers may be sized with a sizing composition known to those of skill in the art. The sizing composition is in no way restricted, and may be any sizing composition suitable for application to glass fibers. The sized fibers may be used for reinforcing substrates such as a variety of plastics where the product's end use requires high strength and stiffness and low weight. Such applications include, but are not limited to, woven fabrics for use in forming wind blades, armor plating, and aerospace structures. In this regard, the present invention also includes a composite material including the inventive glass fibers, as described above, in combination with a hardenable matrix material. The matrix material may be any suitable thermoplastic or thermoset resin known to those of skill in the art, such as, but not limited to thermoplastics such as polyesters, polypropylene, polyamide, polyethylene terephtalate, and polybutylene, and thermoset resins such as epoxy resins, unsaturated polyesters, phenolics, vinylesters, and elastomers. These resins can be used alone or in combination.

Having generally described this invention, a further understanding can be obtained by reference to certain specific examples illustrated below which are provided for purposes of illustration only and are not intended to be all inclusive or limiting unless otherwise specified.

EXAMPLES

Example 1

High Performance Glass Compositions

Glass compositions according to the present invention were made by mixing reagent grade chemicals in proportioned amounts to achieve a final glass composition with the oxide weight percentages set forth in Table 4. The raw materials were melted in a platinum crucible in an electrically heated furnace at a temperature of 1650° C. for 3 hours. The forming viscosity (i.e., the temperature that corresponds to a viscosity of about 1000 Poise) was measured using a rotating cylinder method (ASTM C965-96 (2007)). The liquidus temperature was measured by exposing glass to a temperature gradient in a platinum-alloy boat for 16 hours (ASTM C829-81 (2005)). Density was measured by the Archimedes method (ASTM C693-93 (2008)) on unannealed bulk glass. The modulus reported in the tables below is an average of measurements on 5 single glass fibers measured in accordance with the procedure outlined in the report, "Glass Fiber and Measuring Facilities at the U.S. Naval Ordnance Laboratory", Report Number NOLTR 65-87, Jun. 23, 1965. The strength was measured on pristine filaments using an Instron tensile testing apparatus (ASTM D2343-09).

TABLE 4

| Chemical | Ex. 1 (% by wt.) | Ex. 2 (% by wt.) | Ex. 3 (% by wt) | Ex. 4 (% by wt.) | Ex. 5 (% by wt.) | Ex. 6 (% by wt.) | Ex. 7 (% by wt.) |
|---|---|---|---|---|---|---|---|
| $SiO_2$ | 72.80 | 80.00 | 71.07 | 71.36 | 72.30 | 72.66 | 72.43 |
| $Al_2O_3$ | 14.38 | 9.54 | 18.50 | 10.28 | 12.99 | 13.99 | 13.34 |
| MgO | 8.93 | 6.90 | 6.87 | 14.75 | 8.35 | 8.77 | 8.49 |
| CaO | 0.52 | 0.25 | 0.25 | 0.29 | 3.00 | 0.50 | 0.46 |
| $Li_2O$ | 3.28 | 3.27 | 3.27 | 3.27 | 3.28 | 4.00 | 3.28 |
| $Na_2O$ | 0.09 | 0.04 | 0.04 | 0.05 | 0.08 | 0.08 | 2.00 |
| Property | | | | | | | |
| Forming Viscosity (Log 3 Temperature) (° C.) | 1434 | 1551 | 1482 | 1302 | 1393 | 1405 | 1415 |
| Liquidus Temperature (° C.) | 1303 | 1369 | 1503 | 1374 | 1237 | 1277 | 1262 |
| Delta-T (° C.) (Forming-Liquidus Temperatures) | 131 | 182 | −21 | −72 | 157 | 128 | 153 |
| Density (g/cc) | 2.42 | 2.35 | 2.41 | 2.46 | 2.44 | 2.41 | 2.42 |
| Modulus (Gpa) | 83.6 | 79.7 | 83.8 | 86.2 | 83.5 | 83.4 | 82.9 |
| Specific Strength (MJ/kg) | 1.92 | 2.09 | 2.07 | 1.79 | 1.85 | 1.9 | 1.88 |
| Specific Modulus (MJ/kg) | 34.6 | 33.9 | 34.8 | 35.0 | 34.20 | 34.50 | 34.30 |

TABLE 5

| Chemical | Ex. 8 (% by wt.) | Ex. 9 (% by wt.) | Ex. 10 (% by wt.) | Ex. 11 (% by wt) | Ex. 12 (% by wt.) | Ex. 13 (% by wt.) |
|---|---|---|---|---|---|---|
| $SiO_2$ | 69.51 | 76.53 | 74.50 | 72.98 | 72.80 | 72.82 |
| $Al_2O_3$ | 15.28 | 5.00 | 15.37 | 14.49 | 14.39 | 14.40 |
| MgO | 10.20 | 11.94 | 5.00 | 9.09 | 8.94 | 8.96 |
| CaO | 1.06 | 1.80 | 1.12 | 0.00 | 0.53 | 0.53 |
| $Li_2O$ | 3.44 | 3.65 | 3.46 | 3.30 | 3.25 | 3.29 |
| $Na_2O$ | 0.51 | 1.08 | 0.55 | 0.14 | 0.09 | 0.00 |
| Property | | | | | | |
| Forming Viscosity (Log 3 Temperature) (° C.) | 1365 | 1320 | 1518 | 1444 | 1437 | 1447 |
| Liquidus Temperature (° C.) | 1263 | 1328 | 1269 | 1274 | 1268 | 1268 |
| Delta-T (° C.) (Forming-Liquidus Temperatures) | 102 | −8 | 249 | 170 | 169 | 180 |
| Density (g/cc) | 2.45 | 2.43 | 2.38 | 2.41 | 2.42 | 2.42 |
| Modulus (Gpa) | 85.5 | 82.7 | 81.5 | 83.6 | 83.7 | 83.6 |
| Specific Strength (MJ/kg) | 1.85 | 1.74 | 2.01 | 1.95 | 1.91 | 1.95 |
| Specific Modulus (MJ/kg) | 34.9 | 34.1 | 34.2 | 34.7 | 34.6 | 34.6 |

Looking at Tables 4 and 5, it can be concluded that the glass compositions of Examples 1-13 have forming viscosity temperatures (fiberizing temperatures) that are applicable for use in refractory furnaces. The specific modulus values for the glasses in some cases exceed commercial R-glass (approximately 34.1 MJ/Kg) and the specific strength in some cases exceed commercially available S2-glass from AGY (approximately 2.01 MJ/Kg). In addition, it may be concluded that these glasses are particularly suited for applications that require both strength and stiffness to be equal to or greater than R-glass (e.g., wind blades). Further, the density of some of the glasses shown in Tables 4 and 5 is extremely low, which allows these glasses to be employed in aerospace applications. This glass has properties similar to those of S2 glass with toughness that is very good.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A composition for preparing high strength, light weight glass fibers comprising:
   $SiO_2$ in an amount from about 69.5 to about 80.0%% by weight of the total composition,
   $Al_2O_3$ in an amount from about 5.0 to about 18.5% by weight of the total composition,
   CaO in an amount from 0.0 to about 3.0% by weight of the total composition,
   MgO in an amount from 5.0 to about 14.75% by weight of the total composition,
   $Li_2O$ in an amount from 3.25 to about 4.0% by weight of the total composition, and
   $Na_2O$ in an amount from 0.0 to about 2.0% by weight of the total composition, wherein said composition comprises less than 1.0% by weight of $B_2O_3$ and wherein said composition is capable of producing glass fibers having a specific modulus of about 33.9 MJ/kg to about 35 MJ/kg.

2. The glass composition of claim 1, wherein
   $Al_2O_3$ is present in an amount from about 9.0 to about 15.4% by weight of the total composition, and
   MgO is present in an amount from 5.0 to about 10.2% by weight of the total composition.

3. The glass composition of claim 2, wherein
   $Al_2O_3$ is present in an amount from about 9.5 to about 15.3% by weight of the total composition, and
   MgO is present in an amount from 6.9 to about 10.2% by weight of the total composition.

4. The glass composition of claim 1, wherein
   $SiO_2$ is present in an amount from about 69.5 to about 74.5% by weight of the total composition, and
   $Al_2O_3$ is present in an amount from about 10.30 to about 18.5% by weight of the total composition.

5. The glass composition of claim 1, wherein
   $SiO_2$ is present in an amount from about 69.5 to about 76.5% by weight of the total composition, and
   $Al_2O_3$ is present in an amount from about 5.0 to about 15.4% by weight of the total composition.

6. The composition of claim 1, wherein said composition is free of $B_2O_3$ and fluorine.

7. The composition of claim 1, wherein said composition has a ΔT up to about 250° C.

8. The composition of claim 1, wherein said composition has a ΔT of from about 100° C. to about 250° C.

9. The composition of claim 1, wherein said composition has a log 3 temperature from about 1255° C. to about 1550° C.

10. The composition of claim 1, wherein said composition has a liquidus temperature no greater than about 1510° C.

11. The composition of claim 1, wherein components of said composition are melted in a refractory tank melter.

12. A continuous high strength, light weight glass fiber produced from a composition according to claim 1.

13. The glass fiber of claim 12, wherein said glass fiber has a specific strength from about 1.74 MJ/kg to about 2.09 MJ/kg.

14. The glass fiber of claim 12, wherein said glass fiber has a pristine fiber tensile strength between about 4200 and about 5000 MPa, a modulus between about 80 and about 86 GPa, and a density between about 2.35 and about 2.46 g/cc.

15. A method of preparing a reinforced composite product comprising combining at least one polymer matrix material and a plurality of glass fibers according to claim 12.

16. The glass fiber of claim 13, wherein said glass fiber has a specific strength of greater than 2.01 MJ/Kg and less than or equal to about 2.09 MJ/kg.

17. The glass fiber of claim 1, wherein said glass fiber has a specific modulus of greater than 34.1 MJ/Kg and less than or equal to about 35.0 MJ/kg.

18. A method of forming a continuous high performance glass fiber comprising:
   providing a molten glass composition including a composition according to claim 1; and
   drawing said molten glass composition through orifices in a bushing to form a continuous glass fiber.

19. The method of claim 18, wherein said glass fiber has a specific strength from about 1.74 MJ/kg to about 2.09 MJ/kg.

20. The method of claim 18, wherein said glass fiber has a specific modulus of greater than 34.1 MJ/Kg and less than or equal to about 35.0 MJ/kg.

21. The method of claim 19, wherein said glass fiber has a specific strength of greater than 2.01 MJ/Kg and less than or equal to about 2.09 MJ/kg.

22. The method of claim 18, wherein said glass fiber has a pristine fiber tensile strength between about 4200 and about 5000 MPa, a modulus between about 80 and about 86 GPa, and a density between about 2.35 and about 2.46 g/cc.

23. A method of preparing a reinforced composite product comprising:
   preparing a plurality of glass fibers according to the method of claim 18 and combining said plurality of glass fibers with at least one polymer matrix material.

24. A reinforced composite product comprising:
   a polymer matrix; and
   a plurality of glass fibers, said glass fibers being produced from a composition comprising:
   $SiO_2$ in an amount from about 69.5 to about 80.0%% by weight of the total composition,
   $Al_2O_3$ in an amount from about 5.0 to about 18.5% by weight of the total composition,
   CaO in an amount from 0.0 to about 1.8% by weight of the total composition,
   MgO in an amount from 5.0 to about 14.75% by weight of the total composition,
   $Li_2O$ in an amount from 3.25 to about 4.0% by weight of the total composition, and
   $Na_2O$ in an amount from 0.0 to about 2.0% by weight of the total composition, wherein said composition has less than 1.0% by weight of $B_2O_3$.

25. The composite product of claim 24, wherein said polymer matrix is a thermoplastic polymer selected from polyesters, polypropylene, polyamide, polyethylene terephtalate, polybutylene and combinations thereof.

26. The composite product of claim 24, wherein said polymer matrix is a thermoset polymer selected from epoxy resins, unsaturated polyesters, phenolics, vinylesters and combinations thereof.

\* \* \* \* \*